Dec. 10, 1946.　　　C. D. RYAN　　　2,412,538
LIQUID LEVEL CONTROLLING DEVICE FOR
ENVELOPE MOISTENING DEVICES
Original Filed April 29, 1940　　4 Sheets-Sheet 1

INVENTOR
Commodore D. Ryan
BY
Blair Curtis & Hayward
ATTORNEYS

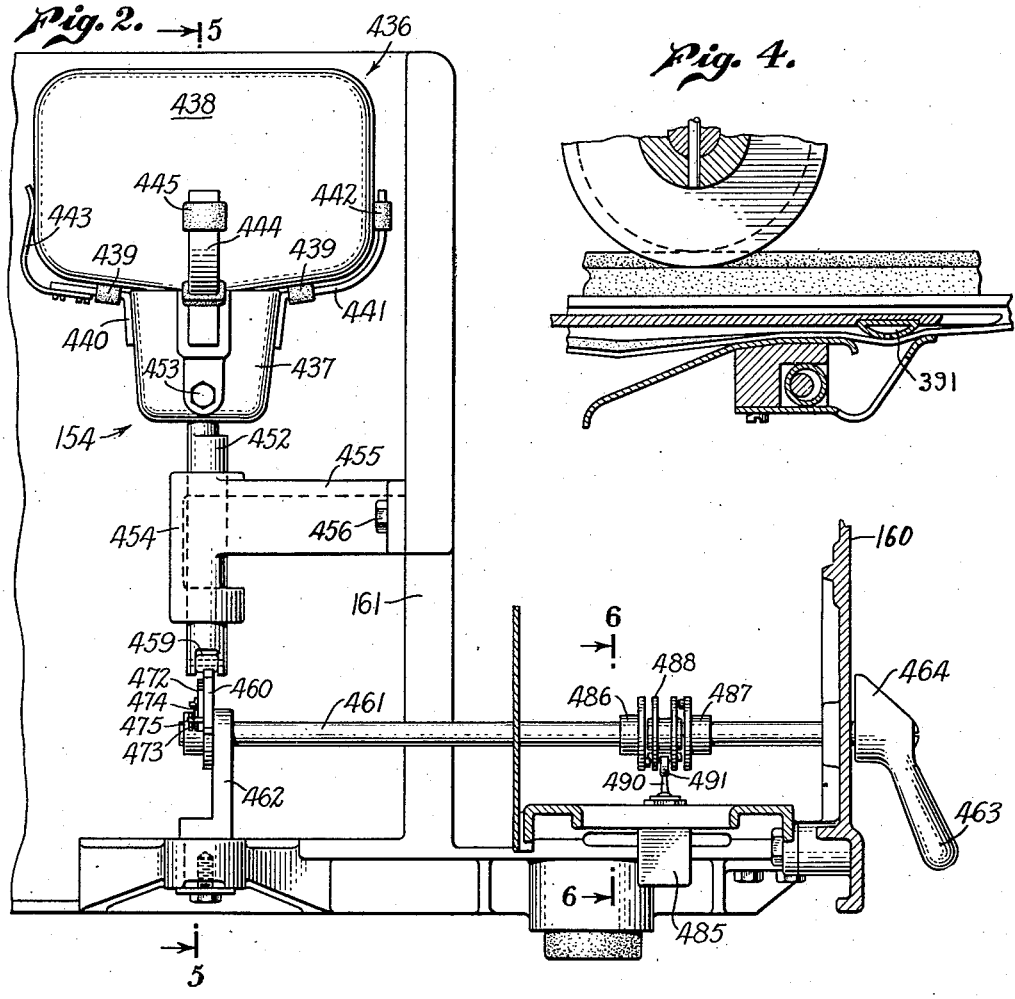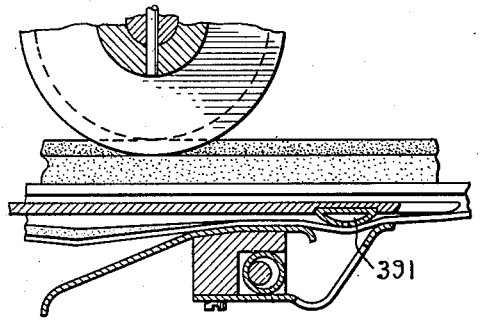

Dec. 10, 1946.  C. D. RYAN  2,412,538
LIQUID LEVEL CONTROLLING DEVICE FOR
ENVELOPE MOISTENING DEVICES
Original Filed April 29, 1940  4 Sheets-Sheet 3

INVENTOR
Commodore D. Ryan
BY
Blair, Curtis + Hayward
ATTORNEYS

Dec. 10, 1946.   C. D. RYAN   2,412,538
LIQUID LEVEL CONTROLLING DEVICE FOR
ENVELOPE MOISTENING DEVICES
Original Filed April 29, 1940   4 Sheets—Sheet 4
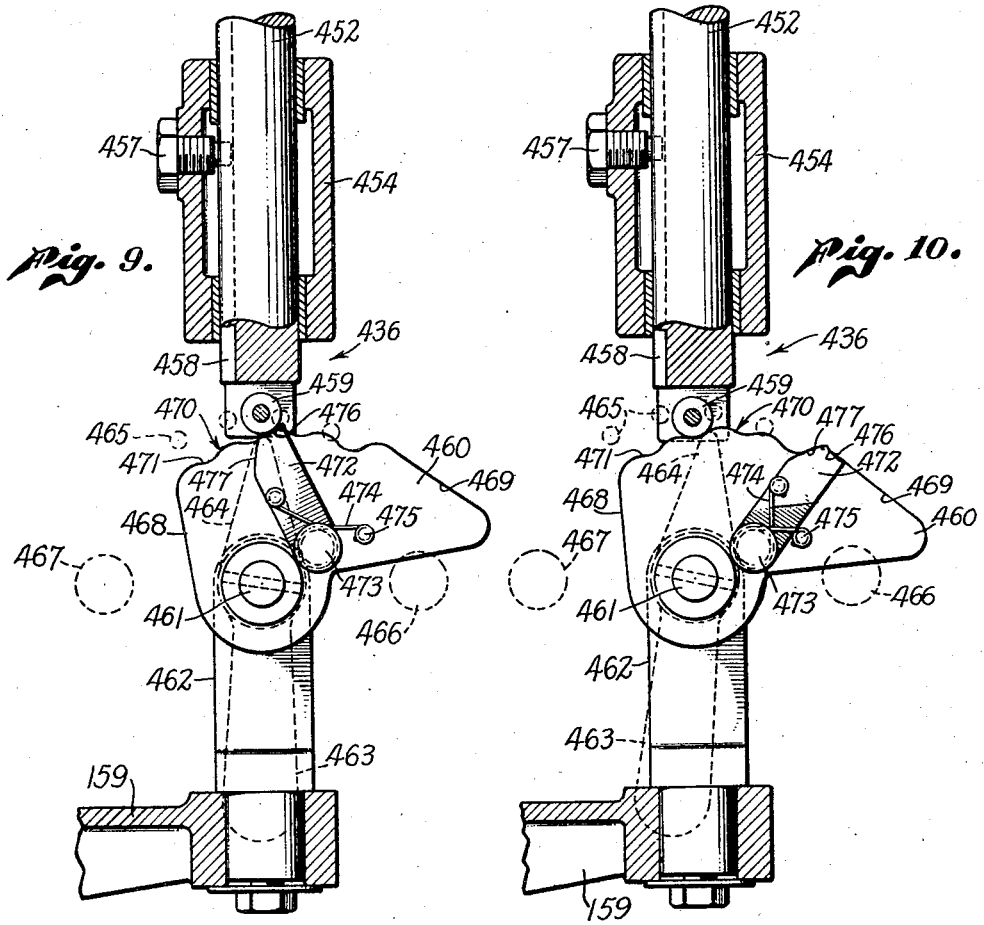
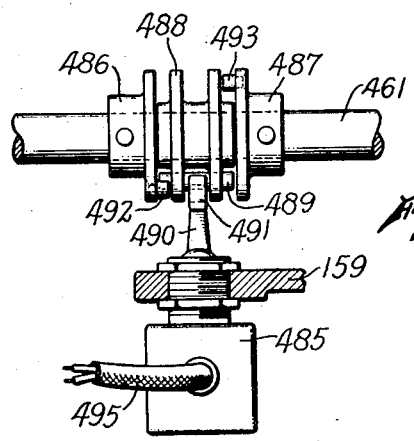
INVENTOR
*Commodore D. Ryan*
BY
*Blair, Curtis & Hayward*
ATTORNEYS Patented Dec. 10, 1946

2,412,538

UNITED STATES PATENT OFFICE 2,412,538

LIQUID LEVEL CONTROLLING DEVICE FOR ENVELOPE MOISTENING DEVICES

Commodore D. Ryan, Los Angeles, Calif., assignor to Commercial Controls Corporation, a corporation of Delaware Original application April 29, 1940, Serial No. 332,305. Divided and this application June 12, 1942, Serial No. 446,755

8 Claims. (Cl. 91—18)

This invention relates to apparatus for supplying liquid to and for controlling the liquid level in a moistening device adapted for use in a mail treating machine or the like.

One of the objects of this invention is to provide liquid supply and level control apparatus characterized by simplicity, durability and efficient operation. Another object is to provide apparatus of the above nature capable of supplying liquid to the moistening device of a mail treating machine or the like to prime the moistening device upon the machine's being placed in operation. Another object is to provide apparatus of the above nature capable of selectively and variably controlling the hydrostatic head in such a moistening device. Other objects will be in part apparent and in part pointed out hereinafter.

The invention accordingly consists in the features of construction, combinations of elements, and arrangements of parts as will be exemplified in the structure to be hereinafter described, and the scope of the application of which will be indicated in the following claims.

This application is a division of Sager et al, Serial No. 332,305, filed April 29, 1940, which has matured into Patent Number 2,371,070, issued March 6, 1945.

In the drawings, wherein there is shown one form of my invention,

Figure 2 is an enlarged fragmental partially sectional elevation of the liquid supply and liquid level controlling apparatus;

Figure 3 is an enlarged fragmental sectional view of the moistening device and its connection with the liquid supply system;

Figure 4 is an enlarged fragmental sectional view taken substantially along the line 4—4 of Figure 3;

Figure 9 is an enlarged fragmental sectional view showing the lower portion of Figures 5 and 7 to illustrate the water supply bottle elevating cam during the return from the priming position illustrated in Figure 7 to its normal operating position illustrated in Figure 10, and to show the manner in which the carry-over pawl carries the cam roller over the two uppermost notches of the cam;

Figure 10 is a view similar to Figure 9, with the exception that the bottle elevating cam roller is shown resting in the second notch of the cam which represents the normal operating level for the water supply bottle; and, Figure 11 is an enlarged sectional view taken substantially along the line 11—11 of Figure 8.

Similar reference characters refer to similar parts throughout the various views of the drawings.

Figure 1:
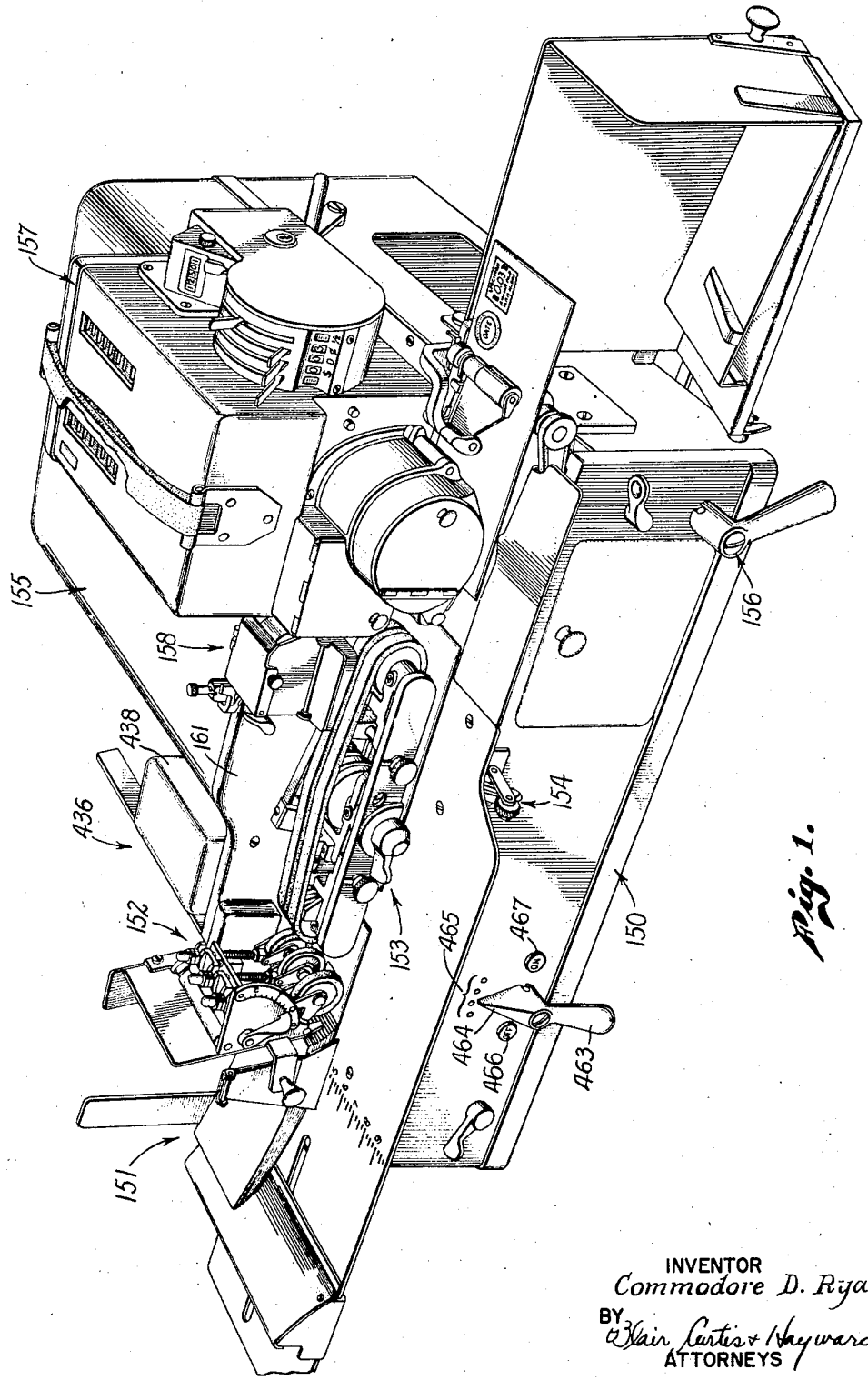
Figure 1 is a perspective view of a mail treating machine having incorporated therein my liquid level control apparatus.

Referring first to Figure 1, I have shown a mail treating machine, such as described in detail in the above-noted Sager et al. application, the machine comprising the following major elements and instrumentalities which, for convenience, will be identified by the general reference numbers preceding such elements and instrumentalities:

150—Frame structure
151—Feeding hopper
152—Stripper
153—Conveyor feeding system for the mail matter
154—Envelope flap moistening device
155—Power plant and driving mechanism
156—Tape feeding device
157—Meter
158—Ink feeding mechanism for the meter The envelope flap moistening device 154 is supplied with water from a bottle generally indicated at 436, the elevation of which may be variably controlled so as to control the hydrostatic head in the moistening device, all as will be described in detail hereinbelow.

The constant level water supply device 436 (Figures 2, 5 and 7) may include cup 437 into which the neck of the water bottle 438 is positioned until the shoulder portion of the bottle engages the resilient pads 439 carried by two of the bottle supporting brackets 440 and 441 (Figure 2). The water bottle is preferably rectangular in cross-section and cup 437 is substantially square in cross-section and each side of the cup is provided with bottle supporting brackets two of which, namely brackets 440 and 441, each previously described, are mounted upon two opposite side faces of the cup. The bracket 441 extends outwardly and upwardly and carries a resilient pad 442 for engaging one side face of the water bottle. The other bracket 440 is provided with a spring finger 443 extending outwardly and upwardly to engage the opposite side face of the water bottle and to yieldingly maintain the bottle against pad 442 of bracket 441. The two opposite side faces of the cup are provided with brackets 444 which likewise extend outwardly and upwardly and are provided with resilient pads 445 for engaging and supporting the opposite side faces of the water bottle. The water bottle is provided with a check valve in the form of a rubber ball 446. The check valve is for the purpose of sealing the outlet of the bottle when the latter is filled with water and inverted during the placing of the bottle in position on the cup member 437. It also prevents such water as remains in the bottle from pouring out into the cup when the bottle is removed for refilling. The cup is provided with a central boss 447 having lug 448 which extends upwardly into the neck of the bottle to lift the check valve ball from sealing engagement with the neck of the bottle.

In this inverted bottle type of feed the water level in the cup is maintained substantially in the plane of the mouth of said bottle and as the water is drawn from the cup and the level drops below the mouth of the bottle, air will pass into said bottle enabling water from the bottle to flow into the cup raising the water level therein until the neck of the bottle is again sealed, thus preventing additional air from entering the bottle and consequently preventing a further flow of water therefrom. Due to this arrangement the water level in the cup may be constantly maintained at substantially the same level and this device forms what is referred to in this specification as the constant level fluid or water supply device and bears the general reference character 436.

The constant level water device 436 is provided with an outlet fitting 449 which in turn is connected to the inlet pipe 413 of the moistening device by a suitable hose connection 450 (Figure 3) and is mounted in the frame of the machine in such manner as to permit this constant level water supply device to be elevated or lowered with relation to the position of the moistening device 154. For this purpose the central boss 447 (Figure 5) is drilled as at 451 to receive the upper end of elevating shaft 452 and is securely fastened to said shaft in an adjusted position by means of set screw 453. Due to this adjustable connection formed between cup 437 and the upper end of shaft 452 the cup may be adjusted in its proper operating level with respect to the elevation of the moistening blade. The elevating shaft 452 is slidably mounted in bearing 454 (Figure 2) of bracket 455 which bracket is fastened to the rear face of the intermediate frame plate 161 of the machine frame by screws 456. Screw threaded into bearing 454 is an aligning screw 457, the point of which extends into a longitudinal groove 458 formed in the elevating shaft to prevent turning of said shaft and yet permitting longitudinal movement of the shaft through the bearing. The lower end of the elevating shaft 452 is bifurcated and provided between its bifurcations with a cam roller 459. An elevating cam 460 cooperates with cam roller 459 to raise or lower the elevating shaft 452 in a manner later to be described.

The elevating cam 460 is mounted upon the inner end of the control shaft 461 (Figure 2) and the adjacent end of the control shaft is journaled in a suitable bracket 462 extending upwardly from the base portion 159 of the machine frame in the manner shown in Figures 2, 5, 7, 9 and 10. The forward end of control shaft 461 extends through the front frame plate 160 of the machine frame and has mounted thereon control handle 463. The control handle is provided with a pointer 464 (Figure 1) for indicating the position of the handle with respect to the indicating buttons 465 which correspond to a series of different operating levels for the fluid supply device 436, and as shown in Figures 1 and 10, the handle is positioned for normal operation of the machine. As shown in Figure 1, an "off" stop button 466 and an "on" stop button 467 are provided to stop the control handle at each end of its travel.

Figure 5:
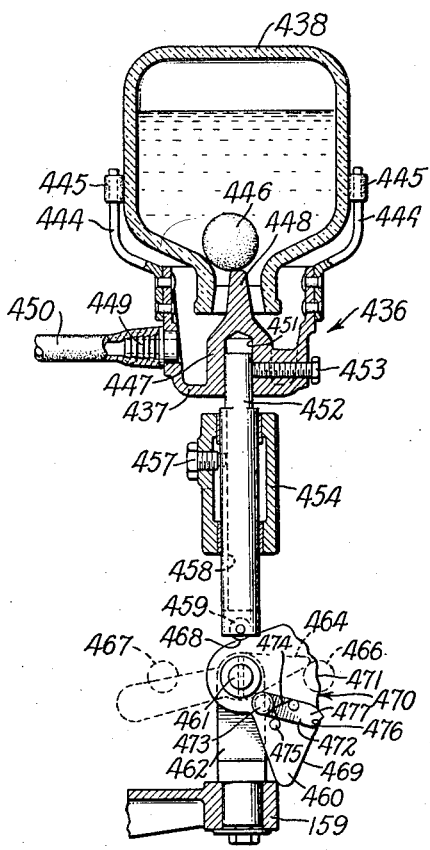
Figure 5 is an enlarged fragmental sectional view of the control cam for raising and lowering the liquid supply bottle, and is taken substantially along line 5—5 of Figure 2.

Figures 5, 7, 9 and 10 are provided to illustrate the operation of the control means for elevating the constant level water supply device 436. These views are taken from the rear of the machine and the control handle 463 is indicated therein in broken lines. Figure 5 indicates the control handle 463 in its off position and illustrates the cam roller 459 of the elevating shaft engaging the low portion 468 of the elevating cam 460. In this view it will be noted that the control handle pointer 464 is in engagement with the "off" stop button 466. It also shows the fluid feed device 436 in its lowest position of adjustment in which position the level of the water in cup 437 is considerably below the moistening blade 389 (Figure 3) and thus shutting off or preventing flow of fluid to the moistening blade.

Figure 7:
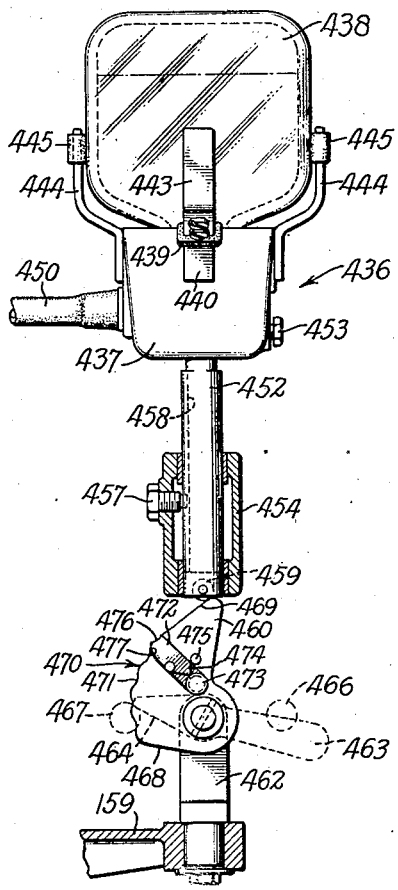
Figure 7 is a view similar to Figure 5, but showing the water supply bottle elevated by its lifting cam to an elevation sufficiently high to cause the water to flow through the moistening device to prime the moistening device for its normal operation.

When the machine is to be placed in operation, control handle 463 will be swung until its pointer 464 engages the "on" button 467 as shown in broken lines in Fig. 7. In this position the elevating cam 460 has been turned until its priming cam surface 469 has turned under cam roller 459 lifting the constant level water supply device 436 until the fluid level maintained within cup 437 is sufficiently above the level of the fluid passage 391 (Figure 4) formed in the moistening blade 389 to cause the water to flow through the blade in a priming action. This, of course, is not a normal operating setting of the mechanism, but is provided to prime the moistening blade thereby forcing any air out of the blade which may have been entrapped therein and conditioning the moistening blade for normal operation, thereby insuring the immediate operation of the moistening device upon placing the machine in operation.

From this extreme position of elevation, the constant level water supply device 436 must be returned to a proper feeding level. This is preferably accomplished by the operator releasing the control handle 463 whereupon due to the weight of the fluid feed device 436 acting upon the high portion of the cam, and also due to the unbalanced weight of control handle 463, the control cam will rotate in a clockwise direction as viewed in Figs. 7 and 9 and thereby presenting an operating portion 470 of the cam to cam roller 459. This operating portion 470 of the cam is provided with a series of detent grooves 471 into any one of which the cam roller 459 may seat. These detent grooves 471 are positioned at progressively greater distances from the center of rotation of the cam whereby if the cam roller 459 is seated in the lower-most of these grooves, the fluid feed device 436 will be positioned at its lowest operating level while if the cam roller 459 is seated in the uppermost of these grooves 471, the fluid supply device will be lifted to its highest operating level.

This range of operating levels for the fluid feed device may be used to control the amount of fluid delivered to the gummed portion of the flaps passed across the capillary slot of the moistening blade. The indicating buttons 465 correspond to the setting of the cam roller in the different detent grooves 471; thus the operator may know at a glance the position of elevation of the feed water device 436.

It is desirable to provide the elevating cam 460 with a carry-over pawl 472 which pawl is pivotally mounted upon the cam, eccentric to the center of rotation of said cam by a suitable pivot pin 473. A torsional spring 474 is provided to act between the carry-over pawl and stop pin 475, which stop pin is carried by the cam. The torsional spring acts to yieldingly maintain the pawl against said stop pin. The free end of pawl 472 is provided with a detent groove 476, which is arranged to receive the cam roller 459 as the control cam turns in a clockwise direction from its priming position as shown in Fig. 7 to its normal operating position as shown in Fig. 10 to carry the cam roller across the two highest detent notches 471 and to deliver the cam roller to the second detent notch as shown in Fig. 9.

Because of the eccentric mounting of the carry-over pawl 472 with respect to the center of rotation of control cam 460, the cam roller 459 will be released from the carry-over pawl as the cam roller enters the second detent notch 471. As soon as the carry-over pawl is released, its torsional spring 474 will return the carry-over pawl to its normal position of rest against stop pin 475 as shown in Fig. 10 and the cam roller 459 will seat in the second detent notch 471 and prevent further rotation of control cam 460. This is a normal operating position and is reached automatically upon the release of the control handle by the operator after the pointer of the control handle has engaged the "on" button 467.

If this normal adjustment shown in Fig. 10 of the control mechanism does not provide sufficient water to the moistening blade, the operator may turn the control cam 460 by means of lever 463 to position the roller in one or other of the two higher notches thereby elevating the water supply device 436 and providing a greater flow of water to the moistening blade. Should the water supply device furnish too much water for moistening a particular type of mail matter when the cam roller is located in its normal operating position, that is, in the second of the detent notches 471, the operator may swing control cam 460 by means of handle 463 to position the cam roller in the first of the detent notches 471 thereby lowering the level of the water supply device 436 to a minimum operating level.

The carry-over pawl 472 is provided with a cam surface 477 to permit the cam roller 459 to ride over the end of the carry-over pawl when the control cam is rotated from its "off" to its priming position.

A drainage system is provided for accumulating the priming fluid or any other excess fluid which may drip from the moistening blade as well as for such fluid as may drain from the blade when it is removed for cleaning or other reasons. This drainage system may include a drip pan 478 (Fig. 3) suitably shaped and formed to extend under the moistening blade and its holder. The pan is provided with suitable offset brackets (not shown) to mount the pan within the frame of the machine by suitable screws. In Fig. 3, the drip pan is shown extending forwardly a sufficient distance to receive the fluid draining from the moistening element holder 389 through the drain passage 401 and at its opposite end, discharging into a drainage trough 481 having a flanged bracket 482 for securing the trough to the rear face of the intermediate frame plate 161 by screws 483. The trough 481 extends diagonally rearwardly as shown in Fig. 3 and delivers the drainage fluid into a removable receiving tray (not shown). The receiving tray is removably mounted within the base of the machine and should be emptied periodically.

A further feature of this invention resides in arranging the motor switch to be actuated by the control handle 463 in such a way that each time the motor switch is actuated to place the machine in operation, the water supply device 436 will be elevated to prime the moistening blade in the manner previously described thereby insuring that the moistening blade will be in proper operative condition simultaneously with the turning on of the driving motor and the switch is so arranged that it can be turned off only when the control handle is swung to its "off" position as shown in Fig. 5. In other words not only will the motor be turned off, but simultaneously therewith the water supply device 436 will be returned to its lower-most position as shown in Fig. 5 to position the water level in said device considerably below the moistening blade and to thereby drain the blade. By draining the moistening blade in this manner, it will greatly assist in preventing it from becoming clogged with foreign matter.

To actuate the main motor switch 485 from control shaft 461, the shaft is provided with a pair of spaced collars 486 and 487 (Fig. 11) pinned to the shaft so as to rotate therewith. Between these collars, a switch actuating spool 488 is journaled upon the shaft and carries between its flanges a switch actuating bar 489 having its ends extending beyond each side of the spool flanges. The switch operating lever 490 is provided at its upper end with a bifurcated head 491 arranged to straddle bar 489 so as to be operated thereby during the rotation of said spool. The switch operating lever extends upwardly from the motor switch 485 which switch is fastened to the base portion 159 of the main frame in the manner shown in Figs. 6, 8 and 11.

Figure 6:
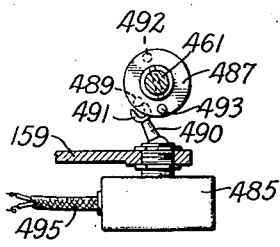
Figure 6 is a fragmental sectional view taken substantially along line 6—6 of Figure 2.
Figure 8:
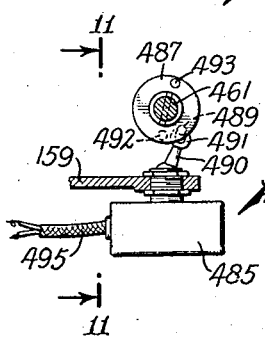
Figure 8 is a view similar to Figure 6 but showing the switch in its "on" position.

The collar 486 is provided with an axially extending stud 492 arranged to engage the switch actuating bar 489 during the rotation of the control handle 463 from its "off" position as shown in Fig. 5 to its "on" position as shown in Fig. 7, to rotate the spool from its position as shown in Fig. 6 to that shown in Fig. 8 whereby the switch actuating bar 489 will engage the bifurcated head 491 of switch lever 490 to swing the switch lever to its "on" position as shown in Fig. 8. Referring to Fig. 6, it will be noted that stud 492 will rotate approximately 90 degrees before engaging the switch actuating bar 489 and thereby requiring the control handle 463 to be swung into engagement with the "on" stop button 467 before the motor switch can be turned on and as previously pointed out, this rotation of the control handle will cause the moistening blade to be primed. It therefore follows, that each time the motor switch is turned on, the moistening blade will be primed for operation. The motor switch 485 is of the snap switch type and as a result, as the stud carries the switch actuating bar and switch lever 490 beyond its dead center position, the snap action will carry the lever beyond its center point to its "on" position moving the spool with its actuating bar ahead of stud 492. This action may be obtained by journaling spool 488 upon shaft 461 and driving it through the engagement of stud 492 with switch actuating bar 489. As will be noted in Fig. 8, the stud 493 carried by collar 487 must be rotated through an arc of more than 90 degrees before it can engage the end of the switch actuating bar 489. This rotation of the control shaft 461 permits the elevating control cam 460 to be returned from its priming position as shown in Fig. 7 past the lower-most of the detent notches 471 before the switch can be actuated to shut off the motor circuit.

In other words, this lost motion connection permits the adjustment of the water supply device 436 to any one of its operating levels without affecting the position of the motor switch. Due to the construction of this control mechanism with its lost motion device, the motor switch cannot be turned off until the water supply means 436 has been lowered to a level below that of the moistening blade and thereby insuring that the water supply will be turned off each time the motor circuit is disconnected.

An important feature of this invention resides in the provision of the above described mechanism whereby through the simple procedure of manipulating the control handle 463 to its "off" position, the motor switch will be turned off, the fluid supply to the moistening blade will be shut off and the moistening blade will be automatically drained.

It will also be apparent that by turning the control handle to its "on" position, the moistening device will be properly conditioned for operation simultaneously with the turning on of the motor switch.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a mechanism for controlling the flow of fluid from a constant level fluid supply device of the cup and inverted bottle type to a flap moistening means of an envelope sealing machine including, a constant level fluid supply device, envelope flap moistening means, a conduit connecting said fluid supply and said moistening means, means mounting said constant level fluid supply device for raising and lowering movement, an elevating means operable for raising said device from a shut-off position whereat the fluid level of said device is below the level of said moistening means to a feeding position whereat the fluid level of said device is even with or elevated to a predetermined level above said moistening means, and means releasably holding the elevating means in any one of a plurality of elevated feeding positions.

2. In a mechanism of the character described a constant level fluid supply device of the cup and inverted bottle type, flap moistening means, a conduit connecting said fluid supply and said moistening means, means mounting said constant level fluid supply device for raising and lowering movement, and elevating means operable for raising said device to a flooding level for effectively priming said flap moistening means while lifting said device from a non-feeding to a feeding level.

3. In a mechanism a constant level fluid supply device of the cup and inverted bottle type, flap moistening means for an envelope sealing machine, a conduit connecting said fluid supply and said moistening means, means mounting said constant level fluid supply device for raising and lowering movement, a cam follower carried thereby, and an elevating cam operatively engaging said follower and having a cam surface including a low level shut-off portion, a section having a plurality of notches representing a selective range of feeding levels for said device into any one of which said cam follower may be seated to maintain said device at a selected feeding level and a high portion for lifting said device to a flooding level for priming said moistening means.

4. In a power driven envelope sealing machine, an envelope flap moistening device, means containing a supply of fluid therefor, means connecting said device and supply for conducting fluid therebetween, a driving motor for said machine, an electric switch for turning on and off said motor, and a control means connected to said fluid supply and to said switch and operable for effecting a flow of fluid from said fluid supply to said device and for actuating said switch to energize said motor when the machine is to be put into operation and operable to effect the discontinuation of fluid flow from said fluid supply and to turn off said switch when the machine is to be shut down.

5. In a power driven envelope sealing machine an envelope flap moistening device, means containing a supply of fluid arranged to assume a shut-off, a priming or a normal condition of fluid feed to said device, a conduit connecting said moistening device and said fluid supply, a driving motor for said machine, an electric switch for controlling the operation of said motor, and a control means connected to said fluid supply and to said switch and operable for conditioning said fluid supply from its shut-off condition through its priming to its normal feeding condition and for actuating said switch for energizing said motor whereby the moistening device will be primed each time the switch is operated to energize the motor.

6. In a power driven envelope sealing machine, an envelope flap moistening device, means containing a supply of fluid arranged to assume a shut-off, a priming or a normal condition of fluid feed to said device, a conduit connecting said moistening device and said fluid supply, a driving motor for said machine, an electric switch for controlling the operation of said motor, and a control means connected to said fluid supply and to said switch and operable for conditioning said fluid supply from its shut-off through its priming, to its normal condition of feed and for actuating said switch for energizing said motor, whereby the moistening device will be primed each time the switch is operated to energize the motor, and said control means being operable for returning said fluid supply to its shut-off condition and for actuating said switch to open the motor circuit whereby when the motor is shut-off, no fluid can flow to the moistening device.

7. In apparatus of the character described, in combination, a device for moistening a gummed envelope flap or the like, a fluid reservoir, means connecting said device and said reservoir for conducting fluid to said device, a driving motor for said apparatus, an electric switch for turning said motor on and off, a manually rotatable shaft, means on said shaft for operating said switch, and control means operatively associated with said shaft and operable upon rotation thereof when said shaft is rocked to close said switch for effecting a flow of fluid from said reservoir to said device.

8. Apparatus according to claim 7 wherein said control means includes mechanism for varying the hydraulic head of the fluid for said moistening device selectively between points above and below the fluid delivery level of said device, whereby said device may be primed, shut off or conditioned for fluid delivery at amounts therebetween.

COMMODORE D. RYAN.